United States Patent
McNab et al.

(10) Patent No.: US 10,162,145 B2
(45) Date of Patent: Dec. 25, 2018

(54) OPTICAL FIBRE INSTALLATION IN FLEXIBLE RISER

(71) Applicant: GE Oil & Gas UK Limited, Bristol (GB)

(72) Inventors: John McNab, Bristol (GB); Philip Michael Nott, Bristol (GB); Richard Lewis Clarke, Bristol (GB)

(73) Assignee: GE OIL & GAS UK LIMITED, Bristol (GB)

( * ) Notice: Subject to any disclaimer, the term of this patent is extended or adjusted under 35 U.S.C. 154(b) by 297 days.

(21) Appl. No.: 14/784,712

(22) PCT Filed: Mar. 17, 2014

(86) PCT No.: PCT/GB2014/050830
§ 371 (c)(1),
(2) Date: Oct. 15, 2015

(87) PCT Pub. No.: WO2014/170633
PCT Pub. Date: Oct. 23, 2014

(65) Prior Publication Data
US 2016/0054534 A1 Feb. 25, 2016

(30) Foreign Application Priority Data

Apr. 17, 2013 (GB) .................................. 1306982.8

(51) Int. Cl.
*G02B 6/50* (2006.01)
*G02B 6/44* (2006.01)
(Continued)

(52) U.S. Cl.
CPC .............. *G02B 6/502* (2013.01); *E21B 17/01* (2013.01); *E21B 17/206* (2013.01);
(Continued)

(58) Field of Classification Search
CPC ...... G02B 6/502; G02B 6/4464; G02B 6/506; G02B 6/52; E21B 17/206; E21B 47/123; E21B 17/01
See application file for complete search history.

(56) References Cited

U.S. PATENT DOCUMENTS

| 4,541,887 A | 9/1985 | Carter |
| 6,517,053 B1 | 2/2003 | Griffioen et al. |

(Continued)

FOREIGN PATENT DOCUMENTS

| CN | 1192278 | 9/1998 |
| GB | 2212940 A | 8/1989 |

(Continued)

OTHER PUBLICATIONS

Hayes et al., Midstream & Subsea Pipeline Condition Monitoring, Offshore technology Conference, Houston, Texas, May 2011.
(Continued)

*Primary Examiner* — John C Hong
(74) *Attorney, Agent, or Firm* — Knobbe, Martens, Olson & Bear, LLP (57) ABSTRACT

A method and apparatus for providing a fiber element are disclosed. The method includes the steps of opening a first control valve element (355) at a proximate end region of a first lumen (310) that extends along a flexible pipe (100), opening a first vent valve element (400) at a remote end region of a second lumen (320) that extends along the flexible pipe (100), providing a new fiber element along the second lumen (320) via an opening (350) at a proximate end region of the second lumen (320) and closing the first vent valve element (382) and the first control valve element (355).

18 Claims, 8 Drawing Sheets (51) Int. Cl.
*E21B 17/01* (2006.01)
*E21B 47/12* (2012.01)
*E21B 17/20* (2006.01)
*G02B 6/52* (2006.01)

(52) U.S. Cl.
CPC .......... *E21B 47/123* (2013.01); *G02B 6/4464* (2013.01); *G02B 6/506* (2013.01); *G02B 6/52* (2013.01)

(56) References Cited

U.S. PATENT DOCUMENTS

| | | |
|---|---|---|
| 2002/0040731 A1 | 4/2002 | Beals et al. |
| 2003/0056954 A1 | 3/2003 | Headworth |
| 2012/0029846 A1 | 2/2012 | Heatley et al. |

FOREIGN PATENT DOCUMENTS

| | | |
|---|---|---|
| GB | 2362445 | 11/2001 |
| WO | WO 00/22470 | 4/2000 |
| WO | WO 2012131315 A1 | 10/2012 |
| WO | WO 2013098546 A1 | 7/2013 |

OTHER PUBLICATIONS

UK Search Report Application No. GB 1306982.8, dated Oct. 16, 2013.
Search Report for App No. PCT/GB2014/050830 dated Jul. 7, 2014, 7 pages.
Nick Weppenaar: "Advances in Fibre Optic Condition Monitoring of Flexible Pipes Integrity Management of Unbonded Flexible Pipelines and Risers" Nov. 27, 2008.
Damon Roberts: "Subsea Integrity Monitoring Using Fibre Optic Strain Sensors" Aug. 20, 2007.
International Preliminary Report on Patentability for international app No. PCT/GB2014/050830 dated Oct. 20, 2015.

OPTICAL FIBRE INSTALLATION IN FLEXIBLE RISER

The present invention relates to a method and apparatus for providing a fibre along a region of a flexible pipe. In particular, but not exclusively, the present invention relates to how one or more optical fibres can be installed along a length of a flexible pipe and thereafter used as part of a pipeline integrity monitoring solution.

Traditionally, flexible pipe has been utilised to transport production fluids, such as oil and/or gas and/or water from one location to another. Flexible pipe has been found to be useful in connecting a subsea location to a sea-level location. Flexible pipe has generally been formed as an assembly of flexible pipe body and one or more end fittings. The pipe body is conventionally formed as a combination of layered materials that form a pressure-containing conduit. The pipe structure allows large deflections in use without causing bending stresses that impair the pipe's functionality over its lifetime. The pipe body is generally built up as a combined structure including tubular metallic and polymer layers which are typically unbonded.

Such unbonded flexible pipes have been used for deep water (less than 3300 feet (1005.84 metres)) and ultra-deep water (greater than 3300 feet (1005.84 metres)) developments. Of course, flexible pipe may also be used for shallow water applications (for example, less than around 500 metres depth) or even for onshore (overland) applications.

A flexible pipe is an example of a structure, which may have a substantial length or height or width, where it is advantageous or essential to monitor certain parameters associated with the structure from time to time. Complex structures with multiple failure modes are good examples of when parameters associated with the structure should be repeatedly or constantly monitored for evidence of failure or for an indication that failure may be about to occur.

In service, flexible pipes are exposed to harsh environments and challenging conditions that subject the structure to demanding physical rigour that is largely unknown or unnoticed throughout the service life of the asset. Resistance to extremes and large fluctuations in strain, temperature and pressure are built into the pipe design, however the pipes are often breached due to accidental damage to the outer shield caused by external objects. Early knowledge of this damage is vital to limit the degradation of the metallic wires due to contact with seawater, and with the early knowledge of breach prompt remedial actions can be triggered to prevent further deterioration of the pipe that may lead to expensive repair or replacement. Using fibre optics as a distributed temperature sensor, the entire length of the asset can be continuously monitored, and the incidence of a breach in the outer shield of the pipe can be efficiently captured.

Various techniques have been suggested for monitoring the state of or performance of a structure such as a flexible pipe. Optical fibres have conventionally been used either alone or as a distributed system including many connected optical fibres, to provide measurements of parameters such as temperature, strain, vibration or the like in the structure.

Conventionally, wherever optical fibre has been needed as part of a monitoring system, the optical fibre element has had to be assembled in the first instance as part of the flexible pipe body of any flexible pipe. This has complicated conventional manufacturing techniques used to create the structure. Also, many structures such as flexible pipes are currently in operation today which were not originally manufactured to include one or more fibre elements. It has until now been impossible or at least exceptionally difficult and thus costly to retrofit and/or replace flexible pipes so as to provide optical fibre components which can subsequently be used as part of a monitoring/sensing system.

It is an aim of the present invention to at least partly mitigate the above-mentioned problems.

It is an aim of certain embodiments of the present invention to provide a method of providing a fibre element along a desired region of a flexible pipe.

It is an aim of certain embodiments of the present invention to provide an apparatus which can be included in a flexible pipe which allows fibre elements to be provided and/or removed as required so as to be able to retrofit new fibre elements and/or introduce and/or replace new fibre elements for whatever subsequent purpose may be desired.

It is an aim of certain embodiments of the present invention to provide a method and apparatus for retrofitting a fibre element along a flexible pipe which does not require access to an end of a flexible pipe which may be inaccessible without substantial upheaval to an extant pipeline.

It is an aim of certain embodiments of the present invention to increase a possible pumping distance for pumping optical fibre components along a flexible pipe relative to conventional techniques.

It is an aim of certain embodiments of the present invention to allow active sensing of fibres during change out of damaged fibres.

According to a first aspect of the present invention there is provided a method of providing a fibre element along a region of a flexible pipe, comprising the steps of:
 opening a first control valve element at a proximate end region of a first lumen that extends along a flexible pipe;
 opening a first vent valve element at a remote end region of a second lumen that extends along the flexible pipe;
 providing a new fibre element along the second lumen via an opening at a proximate end region of the second lumen; and
 closing the first vent valve element and the first control valve element.

Aptly, the method further comprises opening the first vent valve element by providing a positive pressure, above a vent valve only positive pressure threshold, in the first lumen.

Aptly, the method further comprises closing the first vent valve element by providing a pressure in the first lumen less than the vent valve only positive pressure threshold.

Aptly, the method further comprises providing the new fibre element by pumping a flow of liquid along the second lumen from the proximate region to the remote end region and entraining a fibre element with the flow of the liquid at the proximate end region.

Aptly, the method further comprises purging the second lumen with a purge fluid subsequent to the step of providing the fibre element along the second lumen.

Aptly, the method further comprises closing the first vent valve element and then closing the first control valve element or closing the first control valve element and then closing the first vent valve element.

Aptly, the method further comprises connecting a fibre pumping unit in fluid communication with the second lumen via the further control valve; disconnecting the fibre pumping unit; and connecting a gas purging unit in fluid communication with the second lumen via the further control valve.

According to a second aspect of the present invention there is provided a method of removing a fibre element located along a region of a flexible pipe, comprising the steps of:

opening a first control valve element at a proximate end region of a first lumen that extends along a flexible pipe;

opening a first vent valve element and a first exit valve element at a remote end region of a second lumen that extends along the flexible pipe and that houses an extant fibre element;

removing the extant fibre element from the second lumen via the first exit valve element until all the extant fibre element has exited the second lumen via the first exit valve element; and closing the first exit valve element.

Aptly, the method further comprises opening the first vent valve element and the first exit valve element by providing a positive pressure in the first lumen above an exit valve positive pressure threshold.

Aptly, the method further comprises closing the first exit valve element by providing a pressure in the first lumen less than the exit valve positive pressure threshold.

Aptly, the method further comprises connecting the first lumen to the second lumen via a one-way valve in a pilot passageway that extends between the first lumen and second lumen.

According to a third aspect of the present invention there is provide a method of replacing a fibre element along a region of a flexible pipe comprising the steps of:

removing an extant fibre element by opening a first control valve element at a proximate end region of a first lumen that extends along a flexible pipe;

opening a first vent valve element and a first exit valve element at a remote end region of a second lumen that extends along the flexible pipe and that houses an extant fibre element;

providing the extant fibre element along the second lumen via an opening at a proximate end region of the second lumen, until all the extant fibre element has exited the second lumen via the first exit valve element;

closing the first exit valve element; and providing a new fibre element via a method comprising opening a first control valve element at a proximate end region of a first lumen that extends along a flexible pipe;

opening a first vent valve element at a remote end region of a second lumen that extends along the flexible pipe;

providing a new fibre element along the second lumen via the opening at a proximate end region of the second lumen; and closing the first vent valve element and the first control valve element.

According to a fourth aspect of the present invention there is provided apparatus for providing a new fibre element and/or removing an extant fibre element from a region of a flexible pipe, comprising:

a first lumen that extends along a flexible pipe from a proximate end region to a remote end region of the flexible pipe;

a second lumen that extends along the flexible pipe from the proximate end region to the remote end region;

at least one pilot passageway connecting the first lumen and second lumen via a one way valve;

a first control valve and a further control valve at the proximate end region of the first lumen and the further lumen respectively; and at least a first vent valve, in fluid communication with the pilot passageway, at the remote end region of the second lumen.

Aptly, the apparatus further comprises at least a first exit valve at a remote end region of the second lumen, in fluid communication with the pilot passageway.

Aptly, the first vent valve opens when a positive pressure above a vent valve only positive pressure threshold is provided in the first lumen.

Aptly, the first exit valve opens when a positive pressure above an exit valve positive pressure threshold is provided in the first lumen.

Aptly, the apparatus further comprises a further pilot passageway connecting the first lumen and the second lumen via a further one way valve associated with a way opposite to a corresponding way of said a one way valve.

Aptly, the apparatus further comprises a further vent valve and a further exit valve, in fluid communication with the further pilot passageway, at the remote end region of the second lumen.

Aptly, the further vent valve opens when a positive pressure above a vent valve only positive pressure threshold is provided in the second lumen and the further exit valve opens when a positive pressure above an exit valve positive pressure threshold is provided in the second lumen.

According to a fifth aspect of the present invention there is provided a flexible pipe comprising a first lumen that extends along a flexible pipe from a proximate end region to a remote end region of the flexible pipe;

a second lumen that extends along the flexible pipe from the proximate end region to the remote end region;

at least one pilot passageway connecting the first lumen and second lumen via a one way valve;

a first control valve and a further control valve at the proximate end region of the first lumen and the further lumen respectively; and at least a first vent valve, in fluid communication with the pilot passageway, at the remote end region of the second lumen.

Aptly, the first lumen and the second lumen each comprise a respective elongate hollow member wound as an armour winding of the flexible pipe.

Aptly, each armour winding is a tensile armour winding of the flexible pipe.

Aptly, each armour winding is a tensile armour winding of the flexible pipe.

Aptly, each pilot passageway, one way valve, vent valve and exit valve is provided on an end fitting at a remote end of the flexible pipe.

Aptly, each control valve is provided on an end fitting at a proximate end of the flexible pipe.

Aptly, the flexible pipe is a riser or jumper or flowline.

According to a sixth aspect of the present invention there is provided apparatus constructed and arranged substantially as hereinbefore described with reference to the accompanying drawings.

According to a seventh aspect of the present invention there is provided a method substantially as hereinbefore described with reference to the accompanying drawings.

According to an eighth aspect of the present invention there is provided a method of providing a fibre element along a region of a structure, comprising the steps of:

opening a first control valve element at a proximate end region of a first lumen that extends along a structure;

opening a first vent valve element at a remote end region of a second lumen that extends along the structure;

providing a new fibre element along the second lumen via an opening at a proximate end region of the second lumen; and closing the first vent valve element and the first control valve element.

According to a ninth aspect of the present invention there is provided a method of removing a fibre element located along a region of a structure, comprising the steps of:
opening a first control valve element at a proximate end region of a first lumen that extends along a structure;
opening a first vent valve element and a first exit valve element at a remote end region of a second lumen that extends along the structure and that houses an extant fibre element;
removing the extant fibre element from the second lumen via the first exit valve element until all the extant fibre element has exited the second lumen via the first exit valve element; and
closing the first exit valve element.

According to a tenth aspect of the present invention there is provided a method of replacing a fibre element along a region of a structure comprising the steps of:
removing an extant fibre element by opening a first control valve element at a proximate end region of a first lumen that extends along a structure;
opening a first vent valve element and a first exit valve element at a remote end region of a second lumen that extends along the structure and that houses an extant fibre element;
providing the extant fibre element along the second lumen via an opening at a proximate end region of the second lumen, until all the extant fibre element has exited the second lumen via the first exit valve element;
closing the first exit valve element; and
providing a new fibre element via a method comprising opening a first control valve element at a proximate end region of a first lumen that extends along the structure;
opening a first vent valve element at a remote end region of a second lumen that extends along the structure;
providing a new fibre element along the second lumen via the opening at a proximate end region of the second lumen; and
closing the first vent valve element and the first control valve element.

According to an eleventh aspect of the present invention there is provided apparatus for providing a new fibre element and/or removing an extant fibre element from a region of a structure, comprising;
a first lumen that extends along a structure from a proximate end region to a remote end region of the structure;
a second lumen that extends along the structure from the proximate end region to the remote end region;
at least one pilot passageway connecting the first lumen and second lumen via a one way valve;
a first control valve and a further control valve at the proximate end region of the first lumen and the further lumen respectively; and
at least a first vent vale, in fluid communication with the pilot passageway, at the remote end region of the second lumen.

According to a twelfth aspect of the present invention there is provided a structure comprising a first lumen that extends along a structure from a proximate end region to a remote end region of the structure;
a second lumen that extends along the structure from the proximate end region to the remote end region;
at least one pilot passageway connecting the first lumen and second lumen via a one way valve;
at first control valve and a further control valve at the proximate end region of the first lumen and the further lumen respectively; and
at least a first vent valve, in fluid communication with the pilot passageway, at the remote end region of the second lumen.

Certain embodiments of the present invention thus provide a built in solution in flexible pipe systems for the installation of fibre sensing technology after installation.

Certain embodiments of the present invention allow for the removal and replacement of pre-installed fibre optic elements without the need for activities in areas where access is impossible or difficult. For example, certain embodiments of the present invention can be utilised with flexible pipes where removal and replacement of fibre optic elements can be carried out without the need for subsea activities.

Certain embodiments of the present invention allow new optical fibres to be introduced along a predetermined pathway in a structure as and when desired.

Certain embodiments of the present invention can be utilised for monitoring structures using systems that run through contaminated zones where access is prohibited. Part of a sensing/monitoring system can be installed and/or subsequently removed and/or re-fitted from an accessible position on the structure without access being required to difficult to reach locations.

Embodiments of the present invention will now be described hereinafter, by way of example only, with reference to the accompanying drawings in which.

In the drawings like reference numerals refer to like parts.

Throughout this description, reference will be made to a structure. It will be appreciated that the type of structure which certain embodiments of the present invention can be applied to is very broad. Some structures may be rigid and some may be flexible. Examples of such structures are buildings, sailing vessels, factories, power stations or the like. Certain embodiments of the present invention are applicable to the use of sensing and monitoring systems that use optical fibres where one or more areas within a structure are particularly inaccessible, either because those areas are dangerous or because they are sealed off and access to those areas would require destruction of certain parts of the structure. Examples of such structures are in the nuclear power industry where access to certain "hot" zones is restricted. Certain embodiments of the present invention are usable with structures which have an elongate nature. That is to say, they have a dimension which is particularly long relative to two further dimensions. Pipelines which include one or more flexible pipes are examples of such elongate structures.

Figure 1:
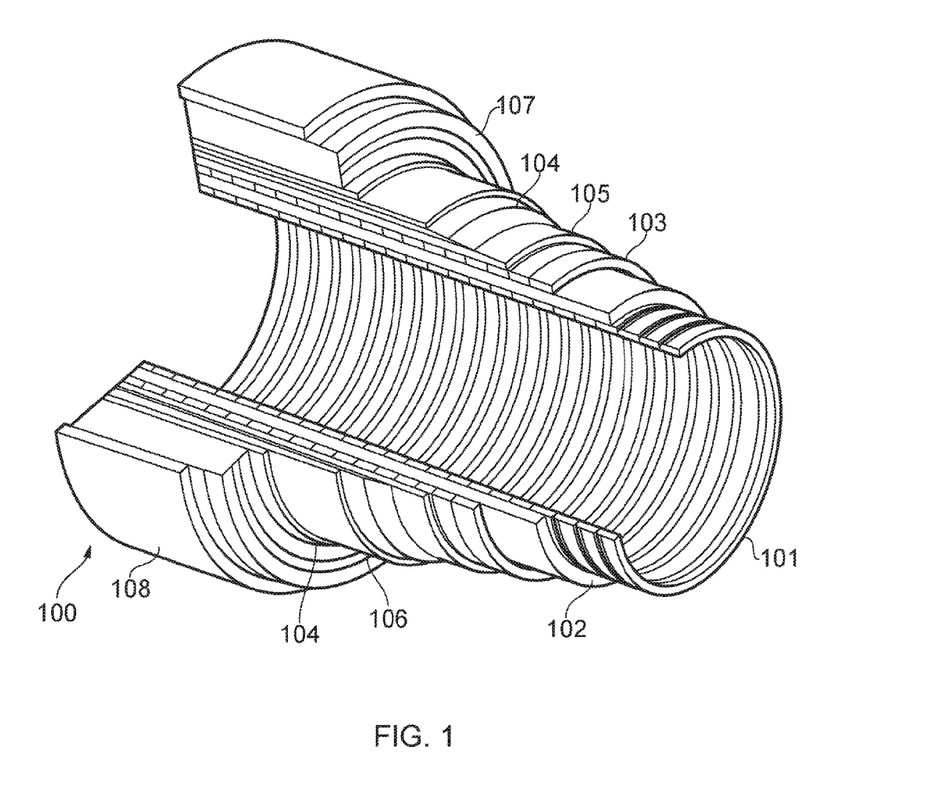
FIG. 1 illustrates flexible pipe body.

Throughout this description, reference will also be made to a flexible pipe. It will be understood that a flexible pipe is an assembly of a segment of pipe body and one or more end fittings in each of which a respective end of the pipe body is terminated. FIG. 1 illustrates how a portion of pipe body 100 (referred to as a segment) is formed from a combination of layered materials that form a pressure-containing conduit. Although a number of particular layers are illustrated in FIG. 1, it is to be understood that the present invention is broadly applicable to coaxial pipe body structures including one or more layers manufactured from a variety of possible materials. It is to be further noted that the layer thicknesses are shown for illustrative purposes only. Although reference is made to unbonded-type flexible pipe it will be appreciated that certain embodiments of the present invention are applicable to use with bonded pipe structures.

As illustrated in FIG. 1, pipe body includes an optional innermost carcass layer 101. The carcass provides an interlocked construction that can be used as the innermost layer to prevent, totally or partially, collapse of an internal pressure sheath 102 due to pipe decompression, external pressure, and/or tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer than ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass the internal pressure sheath is often referred to as a liner.

An optional pressure armour layer 103 is a structural layer with elements having a lay angle close to 90° that increases the resistance of the flexible pipe to internal and external pressure and mechanical crushing loads. The layer also structurally supports the internal pressure sheath, and is typically an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers 104 of tape which each help contain underlying layers and may act as a sacrificial wear layer to help prevent abrasion between adjacent layers.

The flexible pipe body also typically includes optional layers of insulation 107 and an outer sheath 108, which comprises a polymer layer used to help protect the pipe against penetration of seawater and other external environments, corrosion, abrasion and mechanical damage.

Each flexible pipe thus comprises at least one portion or segment of pipe body 100 together with an end fitting located at at least one end of the flexible pipe. An end fitting provides a mechanical device which forms the transition between the flexible pipe body and a connector. The different pipe layers as shown, for example, in FIG. 1, are terminated in the end fitting in such a way as to transfer the load between the flexible pipe and the connector.

Figure 2:
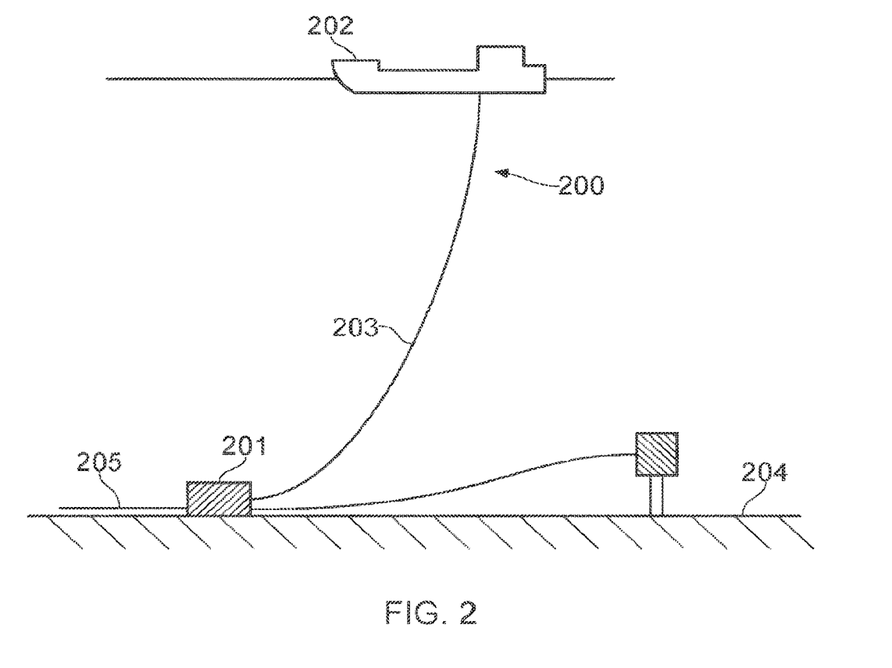
FIG. 2 illustrates use of a flexible pipe.

FIG. 2 illustrates a riser assembly 200 suitable for transporting production fluid such as oil and/or gas and/or water from a subsea location 201 to a floating facility 202. For example, in FIG. 2 the subsea location 201 includes an end of a subsea flow line. The flexible flowline 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be a single segment of flexible pipe body or multiple segments of flexible pipe body with end fittings connected end-to-end.

It will be appreciated that there are different types of riser, as is well-known by those skilled in the art. Certain embodiments of the present invention may be used with any type of riser, such as a freely suspended riser (free, catenary riser), a riser restrained to some extent (buoys, chains) or a totally restrained riser or the like. Certain other embodiments of the present invention can be used as flowlines or jumpers.

There are various physical characteristics of a flexible pipe that are useful to measure and are used as an indication of the health of the asset. In general, the existing methods of condition monitoring fall into three main categories; pipe degradation monitoring, pipe performance monitoring and specific incidence occurrence detection. Degradation monitoring may include technology such as polymer coupon monitoring, annulus vent gas monitoring, dynamic stress or strain measurement (for fatigue life assessment) whilst performance monitoring such as slugging detection can give assurance of flow. Outer shield breach is an example of incidence occurrence detection and would be supported by some means of alerting the operator than an undesired event has taken place so that action can be taken. Common to all types of condition monitoring is the employment of sensing technology. Electrical, magnetic and optical based systems are used to measure physical attributes either directly (e.g. strain of a metal strength element) or indirectly (e.g. the use of gas analysis to infer the onset of corrosion). Fibre-optic sensing, including distributed sensing has been found to be a well suited application. Distributed sensing can provide sensing distances of several tens of kilometres and typically can offer a spatial resolution as low as 0.5 m. The three principle types of fibre-based sensing systems are Rayleigh, Brillouin and Raman. The Brillouin technique will not differentiate between strain and temperature, posing a technical challenge in the application of flexible pipes given the constantly fluctuating temperature and motion, whereas the Raman method will provide temperature readings that are independent of strain.

Certain embodiments of the present invention thus utilise optical fibre distributed sensors to provide simultaneous distributed measurements of temperature, strain, and/or vibration. Temperature, strain and vibration are examples of parameters which can be monitored using an optical fibre system. As well as detecting parameters and predicting conditions and events leading to problems such as leaks, an optical fibre system provides a way of detecting and locating small leaks in gas pipelines below a threshold of present leak detection systems which would not use optical fibre sensors. An optical fibre is an example of a fibre element which from time to time should be provided throughout a structure. An electrical wire or a cord is another example and it will be understood that certain embodiments of the invention are not restricted to use with optical fibres.

Figure 3:
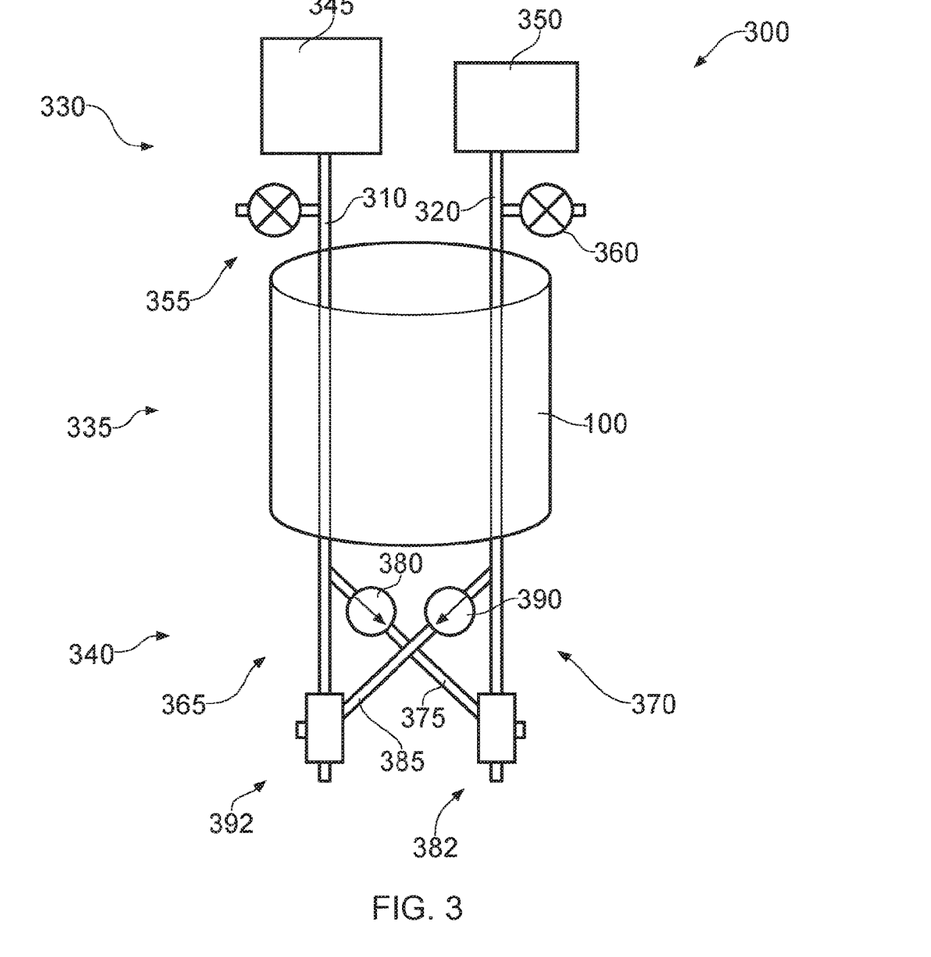
FIG. 3 illustrates a system for introduction and removal of optical fibres in a flexible pipe structure.

FIG. 3 illustrates how certain embodiments of the present invention can be utilised to introduce and/or remove and/or retrofit a fibre element such as an optical fibre along a length of flexible pipe body. The system 300 illustrated in FIG. 3 includes a first lumen 310 and a second lumen 320. Each lumen provides a communication passageway along which an optical fibre can be located. FIG. 3 is schematic in nature and includes an upper section 330, an intermediate section 335 and a lower section 340. The upper section can selectively include a fibre manipulation unit 345 connectable to a top end of the first lumen 310 and further fibre manipulation unit 350 connectable to a respective top end of the second lumen 320. The fibre manipulation unit can be a fibre pumping unit or gas purging unit which are selectively removable and connectable to the end of the lumen via an opening. A first control valve 355 is connected to the first lumen 310 and a further control valve 360 is connected to the second lumen 320. Each control valve 355, 360 can be selectively opened or closed to allow a fluid to be introduced into a respective lumen. The fluid can be a liquid or gas and the pressure of the introduced fluid can be constant or selectively varied. The upper section is in an easy to access area such as a surface location and an upper end of the lumens is referred to as a proximate end.

The intermediate section of the system 300 is a structure such as a segment of flexible pipe body 100 which includes a rigid tube wound as one of the tensile armour windings in a tensile armour layer 105, 106. It will therefore be appreciated that whilst the lumens 310, 320 illustrated in FIG. 3 are illustrated as following a generally straight path in practise those lumens, when wound helically along the length of the flexible pipe body, will adopt a generally helical shape.

The lower section 340 of the system 300 includes a remote end 365 of the first lumen 310 and a remote end 370 of the further lumen 320. A first pilot passage 375 extends from the first lumen 310, via a non-return valve 380, to a valve unit 382 at the end of the second lumen 320. A further pilot passage 385 extends, via a non-return valve 390, to a further valve unit 392 at the end of the first lumen 310. The lower section is aptly in a difficult to access area such as a subsea location.

Figure 4:
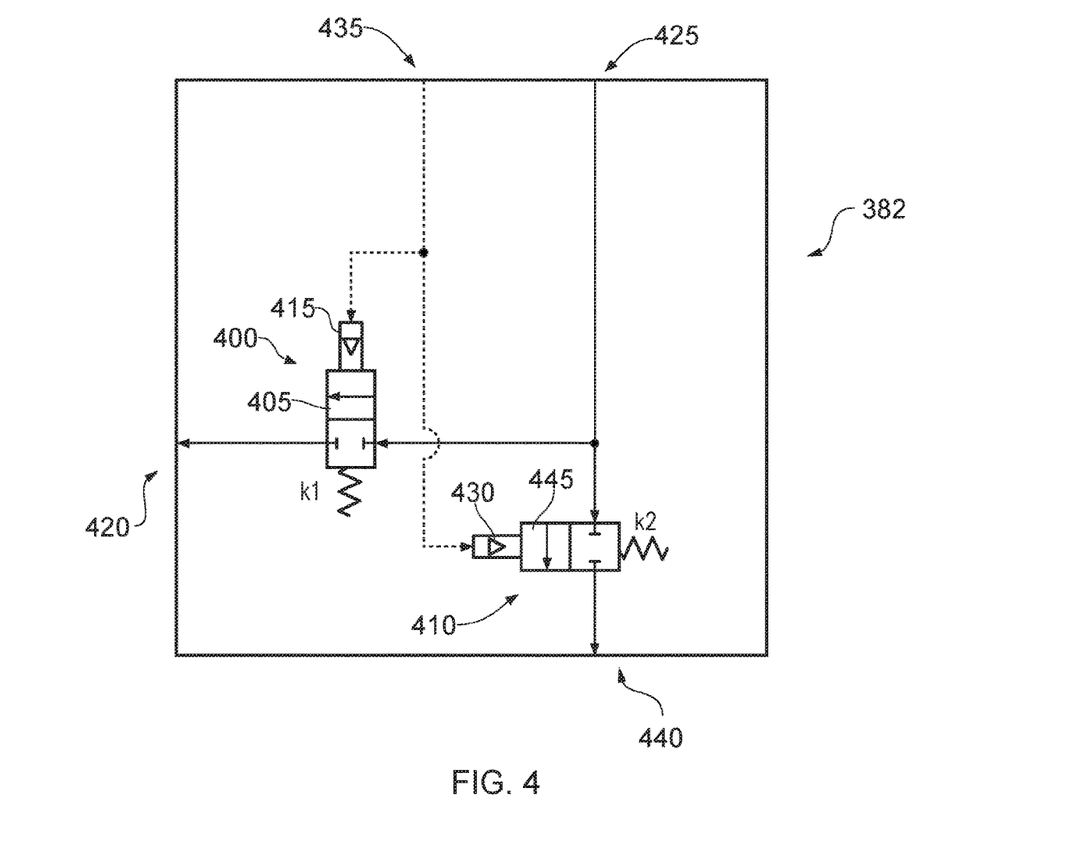
FIG. 4 illustrates the functionality of a valve unit.

FIG. 4 illustrate the valve unit 382 in more detail. It will be appreciated that the valve unit 392 on the end of the first lumen 310 is identical other than being connected to different lumens and pilot passageways. The valve unit 382 includes a vent valve 400 and an exit valve 410. A controller 415 of the vent valve 400 is in fluid communication with the pilot passage 375. Fluid pressure in the pilot passage 375 thus acts to control a state of the vent valve 400. When in an open state the vent valve 400 opens to form a fluid connection allowing a vent path to be created between an external orifice 420 and a tube connection port 425 connected to the lumen which is not connected to the valve unit 382. A constant bleed 405 is provided across the vent valve.

The exit valve 410 also includes a controller 430 which is connected to the pilot passage 375 leading to the lumen which is not connected at its end to the valve unit 382. Thus fluid pressure in the pilot passageway, which is received at a control pressure input orifice 435, is used to control the state of the exit valve. In a closed state the exit valve 410 seals an end of the second lumen 320. In an open state the exit valve provides a continuation to the lumen leading to an exit orifice 440. A constant bleed 445 is provided across the exit valve.

The pressure in the pilot passageway which opens the vent valve and the exit valve can be set by selecting an appropriate spring rate K1 and K2 respectively. The vent valve has a predetermined pressure threshold $P_{VV}$ less than the predetermined pressure threshold $P_{EV}$ of the exit valve. That is to say when the pressure in the pilot passageway reaches a first predetermined positive pressure threshold the vent valve opens. If the pressure in the pilot passage is in increased eventually the exit valve will open. If the pressure in the pilot passage is then reduced the exit valve will close whilst the vent valve will remain open. If the positive pressure in the pilot passage is then reduced further the vent valve will closed when the pressure drops below the venting pressure threshold.

Figure 5:
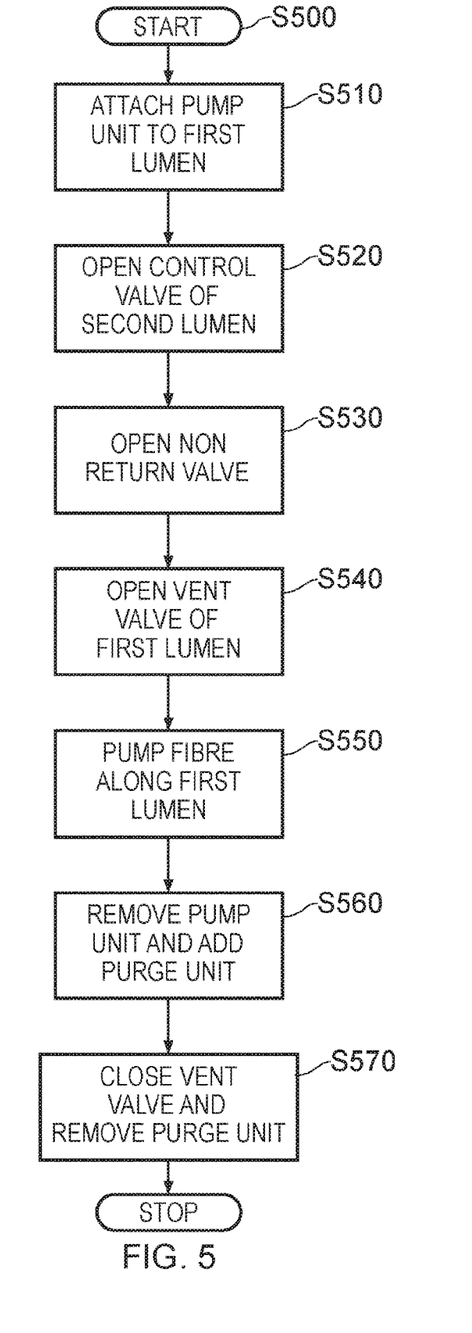
FIG. 5 illustrates a fibre introduction process.

FIG. 5 helps illustrate a process for installing or introducing a fibre into a lumen. It will be appreciate that whilst the example described refers to the introduction of a fibre along the first lumen 310 an almost identical process could be used to introduce a fibre along the further lumen. The two lumens cooperate as a pair to allow a fibre to be introduced along one lumen under the control exercised by varying pressure in the remaining lumen of the pair. More than one pair of lumens could of course be utilised in a structure. As illustrated in FIG. 5 after a start illustrated by step S500 a pump unit is attached to an end of the first lumen 310. This attachment step is illustrated by step S510. The control valve 360 of the second lumen 320 is then opened at step S520. During these steps the control valve 355 remains closed. A pressure is then introduced into the second lumen 320 via the control valve 360 of that lumen. The pressure introduced into the second lumen 320 opens the non-return valve 390 and activates the valve unit 392. The step of opening the non-return valve 390 is illustrated in step S530. As the pressure in the second lumen increases it reaches a threshold pressure sufficient to open the vent valve of the first lumen. This is illustrated by step S540 in FIG. 5. This allows fluid flow through the first lumen. The pressure in the pilot passage 385 does not increase to the threshold pressure $P_{EV}$ associated with the exit valve in the valve unit 392 at the end of the first lumen 310.

A fibre can then be pumped along the first lumen 310 as illustrated as step S550. This is carried out by operating the pumping unit attached to the top of the first lumen. The fibre is stopped due to the exit valve being in a closed state at the bottom of the first lumen. The fact that the fibre is duly located along the whole length of the lumen can be sensed by a conventional technique such as by measuring a length of fibre installed in the lumen or the like. The pumping unit is then removed from the top of the first lumen and a purge unit is fixed in its place. This is illustrated by step S560 in FIG. 5. It will be appreciated that these could of course be carried out as separate steps independent of each other. The purge unit is then operated to remove the pumping fluid that was used to introduce the fibre along the first lumen. At a predetermined time calculated to ensure that sufficient removal of pumping fluid has been achieved and near the end of the purging the pressure in the second lumen 320 is reduced to ambient pressure via the control valve 360. This closes the one way valve 390 and then after a short period of time the small bleed 405 in the vent valve 400 of the valve unit 392 closes the vent valve. The gas purging equipment is then removed. These steps which are in fact separate and distinct are illustrated as step S570 in FIG. 5 and the installation is considered complete.

Figure 6A:
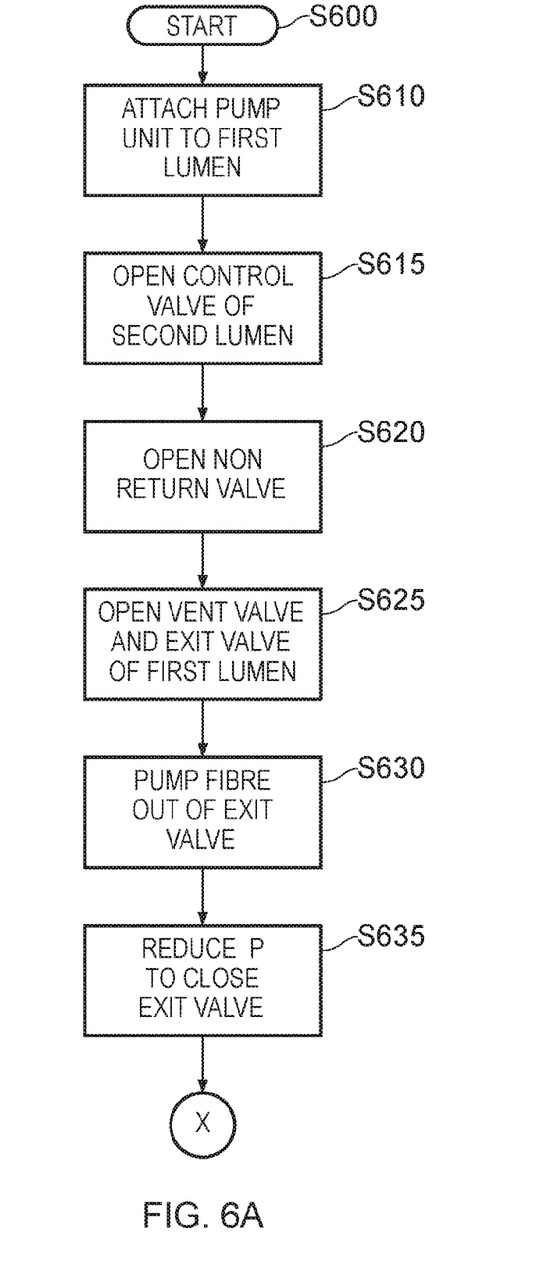
FIG. 6 illustrates a fibre removal process.

FIG. 6 illustrates the process by which a fibre can be removed from a lumen. The process starts at step S600 and a pump unit is secured to the proximate end of the first lumen 310. This is illustrated by step S610. The control valve 355 of the first lumen 310 is closed. The control valve 360 on the further lumen 320 in the pair is then opened and this is illustrated as step S615. A fluid pressure is introduced into the further lumen 320 and the pressure opens the non-return valve 390 in the pilot passage 385. This opening of the non-return valve 390 is illustrated as step S620. The pressure that is provided in the further lumen 320 and pilot passage 385 in a removal step is greater than the threshold pressure $P_{EV}$ of the exit valve in the valve unit 392 at the distal end of the first lumen 310. That is to say the pressure is sufficient to open both the exit valve and the vent valve of the first lumen. These will open one after another or simultaneously. This is illustrated as step S625. The fibre pumping unit 345 attached to the top end of the first lumen 310 is then operated to pump the fibre out of the lumen 310. The fibre is pumped out via the exit aperture 440 through the exit valve. The removed fibre, which may be in an inaccessible region such as a subsea environment, merely spools out into an adjacent region as waste. When the fibre is entirely removed from the tube, which is determined by conventional techniques (such as by monitoring the volume of pumped fluid and applying an incremental factor to ensure the full volume of the lumen 310 has been ejected at the distal end) the pressure in the second lumen 320 is reduced below the Threshold pressure $P_{EV}$ of the exit valve. This closes the exit valve as illustrated by step S635 in FIG. 6A.

Figure 6B:
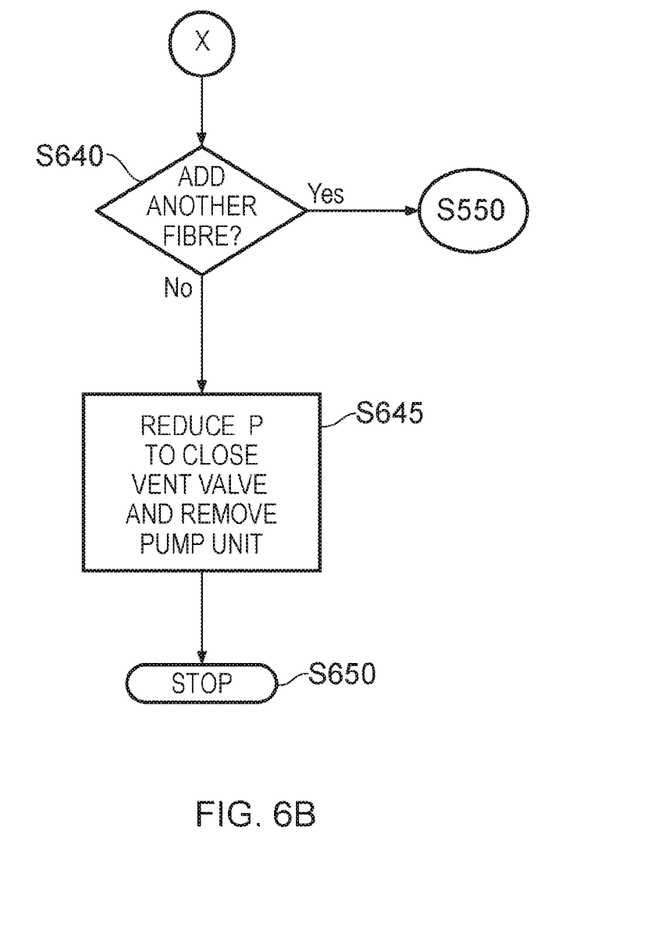

FIG. 6B carries on in the sequence of the process illustrated in FIG. 6A. At this stage a decision is made as to whether or not a new fibre is to be added into the now empty lumen 310. If a decision is that such a fibre is to be introduced then the steps from step 550 onwards, as illustrated in FIG. 5, are followed. If no new fibre is to be added at that moment in time then the pressure can be reduced further to close the vent valve in the valve unit 392 at the remote end of the first lumen 310 and the pump unit can be removed. These two separate events/activities are illustrated as step S645 in FIG. 6B followed by a stop S650.

Figure 7:
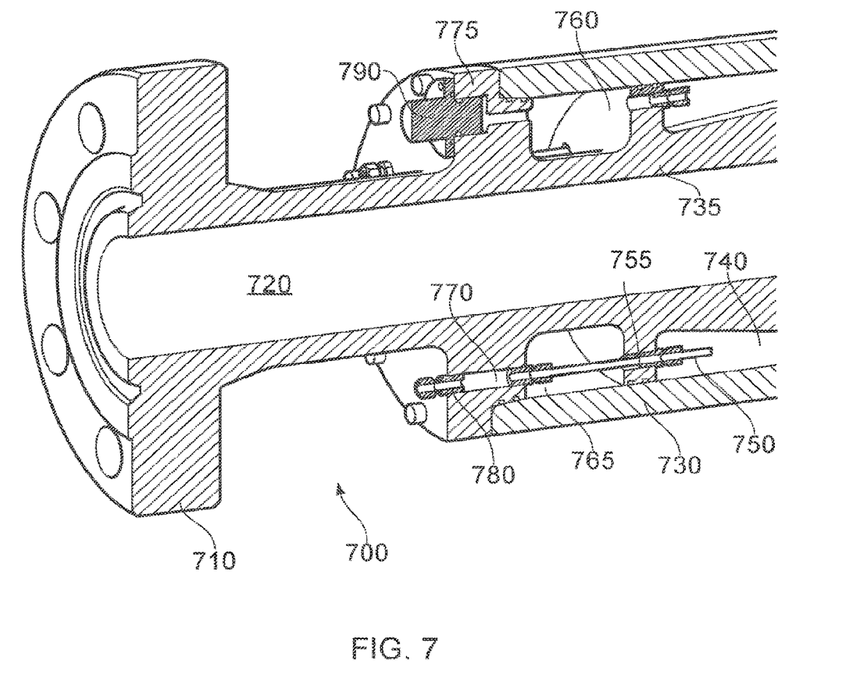
FIG. 7 illustrates connectors on an end fitting.

FIG. 7 helps illustrate how the lumens which extend through the flexible pipe body exit at end fittings at the upper (proximate) end of the lumen and the lower (distal) end. FIG. 7 shows an end fitting 700 which includes a connector 710 which can be bolted or otherwise secured to an adjacent end fitting or to a rigid structure. The end fitting has a central bore 720 along which fluid transported by a flexible pipe is carried. An end of the flexible pipe body of the flexible pipe is terminated in the end fitting via a technique which is in many ways conventional. A jacket 730 is fitted to an end fitting body 735 forming a space 740 between the two parts where armour wires are terminated. As illustrated in FIG. 7 one or more conventional armour wires are substituted by a tube which is rigid enough not to be crushed during use and manufacture but which is flexible enough to be wound along the length of the flexible pipe body like an armour winding. Other container shapes that form a lumen along which a fibre element can be moved could of course be utilised according to certain embodiments of the present invention. An end region 750 of the tube, which forms a part of the lumen 310, 320, passes through a spacer 755 running through an aperture in a flange 760 of the end fitting body 735. The tube end terminates in a connector 765 which is at an end of a bore 770 running through a further flange 775 of the end fitting body 735. An end connector 780 terminates the lumen and this connector 780 can be enclosed in a housing 790 which encapsulates and incorporates the distal valve arrangements. Such housings are known to those skilled in the art.

Certain embodiments of the present invention provide an integrated approach to fibre sensing and fibre installation within a flexible pipe system. Sensor tubes installed in a flexible pipe are connectable to valve and vent elements to provide control of a pumping process used to remove and/or introduce optical fibres without the need for subsea operations. This avoids the need for diver or ROV interaction. Certain embodiments of the present invention future proof flexible pipe installations to enable them to encompass sensor technology as and when that technology is developed. Certain embodiments of the present invention can of course be designed as a skid unit to be retrofitted as a one-off process by diver or ROV operation so that fibres can subsequently be introduced and removed as desired.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of providing a fiber element along a region of a flexible pipe having a first lumen that extends along the flexible pipe from a proximate end region to a remote end region of the flexible pipe and a second lumen that extends along the flexible pipe from the proximate end region to the remote end region, comprising the steps of:
   opening a first control valve element at a proximate end region of the first lumen;
   opening a first vent valve element at a remote end region of the second lumen;
   providing a new fiber element along the second lumen via an opening at a proximate end region of the second lumen; and
   closing the first vent valve element and the first control valve element.

2. The method as claimed in claim 1, further comprising the steps of:
   opening the first vent valve element by providing a positive pressure, above a vent valve only positive pressure threshold, in the first lumen.

3. The method as claimed in claim 1, further comprising the steps of:
   closing the first vent valve element by providing a pressure in the first lumen less than the vent valve only positive pressure threshold.

4. The method as claimed in claim 1, further comprising the steps of:
   providing the new fiber element by pumping a flow of liquid along the second lumen from the proximate region to the remote end region and entraining the new fiber element with the flow of the liquid at the proximate end region.

5. The method as claimed in claim 1, further comprising the steps of:

purging the second lumen with a purge fluid subsequent to the step of providing the fiber element along the second lumen.

6. The method as claimed claim 1, further comprising the steps of:
closing the first vent valve element and then closing the first control valve element or closing the first control valve element and then closing the first vent valve element.

7. The method as claimed in claim 1, further comprising the steps of:
connecting a fiber pumping unit in fluid communication with the second lumen via the opening;
disconnecting the fiber pumping unit; and
connecting a gas purging unit in fluid communication with the second lumen via the opening.

8. A method of removing a fiber element located along a region of a flexible pipe having a first lumen that extends along the flexible pipe from a proximate end region to a remote end region of the flexible pipe and a second lumen that extends along the flexible pipe from the proximate end region to the remote end region, comprising the steps of:
opening a first control valve element at a proximate end region of the first lumen;
opening a first vent valve element and a first exit valve element at a remote end region of the second lumen that houses an extant fiber element;
removing the extant fiber element from the second lumen via the first exit valve element until all the extant fiber element has exited the second lumen via the first exit valve element; and
closing the first exit valve element.

9. The method as claimed in claim 8, further comprising the steps of:
opening the first vent valve element and the first exit valve element by providing a positive pressure in the first lumen above an exit valve positive pressure threshold.

10. The method as claimed in claim 8, further comprising the steps of:
closing the first exit valve element by providing a pressure in the first lumen less than the exit valve positive pressure threshold.

11. The method as claimed in claim 8, further comprising the steps of:
connecting the first lumen to the second lumen via a one-way valve in a pilot passageway that extends between the first lumen and second lumen.

12. Apparatus for providing a new fiber element and/or removing an extant fiber element from a region of a flexible pipe, comprising:
a first lumen that extends along a flexible pipe from a proximate end region to a remote end region of the flexible pipe;
a second lumen that extends along the flexible pipe from the proximate end region to the remote end region;
at least one pilot passageway connecting the first lumen and second lumen via a one way valve;
a first control valve and a further control valve at the proximate end region of the first lumen and the further lumen respectively; and
at least a first vent valve, in fluid communication with the pilot passageway, at the remote end region of the second lumen.

13. The apparatus as claimed in claim 12, further comprising:
at least a first exit valve at a remote end region of the second lumen, in fluid communication with the pilot passageway.

14. The apparatus as claimed in claim 12, further comprising:
the first vent valve opens when a positive pressure above a vent valve only positive pressure threshold is provided in the first lumen.

15. The apparatus as claimed in claim 12, further comprising:
the first exit valve opens when a positive pressure above an exit valve positive pressure threshold is provided in the first lumen.

16. The apparatus as claimed in claim 12, further comprising:
a further pilot passageway connecting the first lumen and the second lumen via a further one way valve associated with a way opposite to a corresponding way of said a one way valve.

17. The apparatus as claimed in claim 16, further comprising:
a further vent valve and a further exit valve, in fluid communication with the further pilot passageway, at the remote end region of the second lumen.

18. The apparatus as claimed in claim 17, further comprising:
the further vent valve opens when a positive pressure above a vent valve only positive pressure threshold is provided in the second lumen and the further exit valve opens when a positive pressure above an exit valve positive pressure threshold is provided in the second lumen.

* * * * *